United States Patent [19]

Ford

[11] Patent Number: 5,322,400

[45] Date of Patent: Jun. 21, 1994

[54] NUT PLATE FASTENER

[75] Inventor: James J. Ford, Schenectady, N.Y.

[73] Assignee: Southco, Inc., Concordville, Pa.

[21] Appl. No.: 25,978

[22] Filed: Mar. 3, 1993

[51] Int. Cl.$^5$ .................... F16B 37/02; F16B 37/06
[52] U.S. Cl. .................... 411/171; 411/175; 411/258; 411/930
[58] Field of Search .............. 411/82, 171, 174, 175, 411/111-113, 258, 930

[56] References Cited

U.S. PATENT DOCUMENTS

| | | | |
|---|---|---|---|
| 2,797,720 | 7/1957 | Mann | 411/175 |
| 3,298,271 | 1/1967 | Krueger | 411/258 |
| 4,402,640 | 9/1983 | Peterson | 411/175 |
| 4,647,263 | 3/1987 | Macfee, Jr. et al. | 411/174 X |
| 4,755,090 | 7/1988 | Macfee, Jr. et al. | 411/174 X |
| 5,108,239 | 4/1992 | Clinch . | |

FOREIGN PATENT DOCUMENTS

| | | |
|---|---|---|
| 2835675 | 2/1980 | Fed. Rep. of Germany ...... 411/174 |
| 534563 | 3/1941 | United Kingdom . |
| 645973 | 11/1950 | United Kingdom . |
| 829019 | 2/1960 | United Kingdom . |
| 0856661 | 12/1960 | United Kingdom . |

OTHER PUBLICATIONS

UK Search Report Aug. 10, 1993.
Simmons Plastic Products Brochure (Simmons, Inc., New York, 1992) Form PL492, Nut Plates.

*Primary Examiner*—Neill R. Wilson
*Attorney, Agent, or Firm*—Paul & Paul

[57] ABSTRACT

A nut plate fastener retains a screw inserted through an aperture formed in a panel. A double-sided adhesive tape may be adhered to one face of the fastener to mount in the panel aperture. The nut plate fastener consists of an integral member and includes a bottom plate with a cone-shaped ring-liked raised screw impression to receive and retain a screw, and a top plate portion connected to the bottom plate. The screw when in the fastened position is confined between the top and bottom plates as to be isolated from objects contained within the panel and adjacent the nut plate fastener. Three tabs project from the bottom face of the bottom plate and project through the tape which centers the fastener in the panel aperture.

46 Claims, 1 Drawing Sheet

NUT PLATE FASTENER

BACKGROUND OF THE INVENTION

1. Field of the Invention

The present invention relates generally to industrial fasteners and more particularly to nut plate fasteners.

2. Brief Description of the Prior Art

Many variety of industrial fasteners are available which act like a nut in retaining a screw. Such fasteners, when formed from resilient materials, for example sheet metal, are often called "nut plates", since they retain a screw and act as a plate in distributing the load. Such nut plates are frequently employed as reinforcement members when a panel wall is relatively week; for example, a panel may be formed of thin plastic or thin metal.

U.S. Pat. Nos. 4,755,090 and 4,647,263, issued Jul. 5, 1988 and Mar. 3, 1987, respectively, and assigned to the assignee of the present application, disclose nut plate fasteners to which this invention relates. The nut plate fasteners disclosed in these patents essentially comprise a one-piece body member having, as portions thereof, an upper leaf and a bottom leaf, with each including an aperture therethrough for receiving the corresponding screw member. The complete disclosures of these aforementioned patents are herein incorporated by reference. A disadvantage of such nut plate fasteners is that wiring, hoses, etc. that reside proximate the structure's panel wall can be damaged by inadvertent contact with the screw member. As such, it is necessary to fasten objects proximate the panel wall which could be damaged by the exposed screw.

There is a need for an improved nut plate fastener which will isolate a screw member away from objects residing proximate a structure's panel wall.

SUMMARY OF THE INVENTION

The present invention provides a nut plate fastener adapted for isolating a screw member away from objects proximate the fastener when mounted in a panel member. The nut plate fastener of the present invention comprises an integral member formed from a resilient material which is adapted for retaining the threaded screw member when inserted through a panel aperture. The integral member includes a bottom plate having a bottom face that is adapted for abutting the panel member when mounted. The nut plate fastener is also included with means for securing the bottom plate to the panel member when in the mounted position. The bottom plate further includes a screw receiving means for receiving and retaining the screw threads of the screw member when inserted through the panel aperture. The integral member is also included with a top plate connected to the bottom plate in order to cover the screw member when received by the nut plate fastener. The screw threads of the screw member in this position are confined between the two plates of the integral member.

Advantageously, the present invention provides a nut plate fastener which isolates a screw member retained by the nut plate fastener away from objects proximate a panel wall.

This and other objects and advantages of this invention will become more apparent when taken into consideration with the following description and the attached drawings.

DETAILED DESCRIPTION

Figure 1:
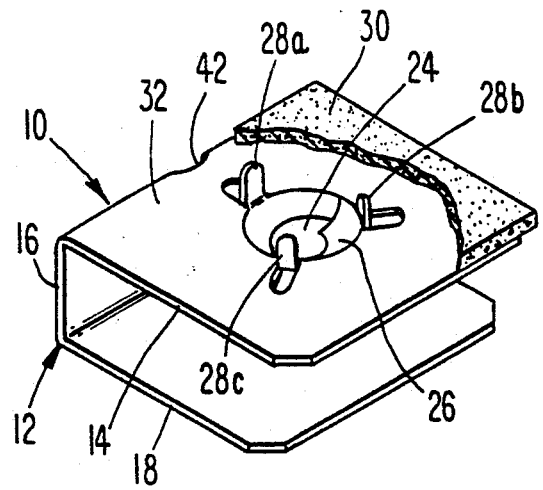
FIG. 1 is a perspective view of a first embodiment of a nut plate fastener according to the present invention.
Figure 2:
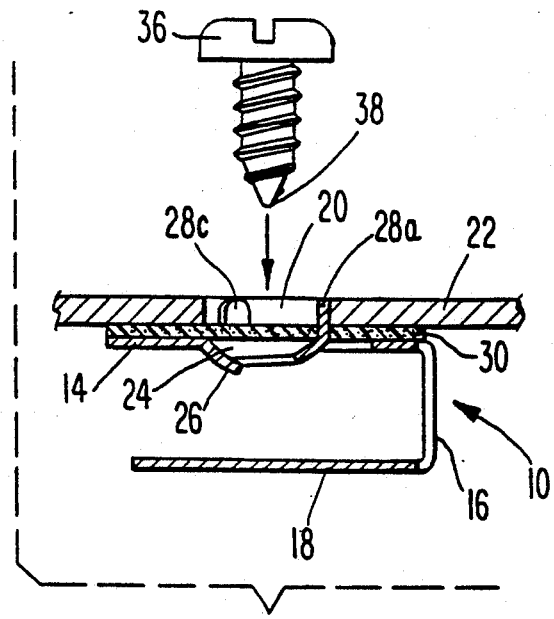
FIG. 2 is a sectional front elevational view of the nut plate fastener of FIG. 1 installed within a panel member.

Referring now to the drawings in detail, wherein like reference numerals indicate like elements throughout the several views, there is shown in FIG. 1 a first preferred embodiment of a nut plate fastener 10 according to the present invention. The nut plate fastener 10 as illustrated comprises a resilient body member 12, preferably stamped from sheet metal, which consists of, as portions of a one-piece integral member, a bottom plate 14, a generally "U" shaped connecting portion 16 and a top plate 18. The nut plate fastener 10 as shown in FIG. 2 is mounted in an aperture 20 which is formed in a panel member 22 of a corresponding paneled structure, such as a refrigerator (not shown). The bottom plate 14 acts as a plate member and bears against the panel member 22 in order to distribute the load. The bottom plate 14 as best seen in FIG. 1 includes a screw receiving means comprising a screw impression hole 24 formed by a substantially helical dome-shaped screw impression 26. For example, the screw impression may be formed by commercially available tools.

Three tabs 28a-28c are punched, or otherwise formed, from the bottom plate 14, however any appropriate number may be provided. The tabs 28a-28c are spaced about the circumference of the screw impression hole 24 and arranged so that, when the nut plate fastener 10 is inserted in the panel aperture 20, the nut plate fastener 10 will be centered in the panel aperture 20. Consequently, the tabs 28a-28c are positioned and spaced in accordance with the size of the panel aperture 20, so that the tabs 28a-28c will fit closely within the panel aperture 20.

A double-sided adhesive tape 30 can be secured to the bottom face 32 of the bottom plate 14 which attaches the resilient body member 12 to the panel member 22. Preferably, the tape 30 is an open cell polyolefin foam tape coated with pressure-sensitive adhesive on both its faces. Its inner face is adhered to the bottom plate 14 and its outer face is covered by an easily removable paper sheet (not shown). An alternative sealer to the double-sided tape 30 is a flexible sheet of pliable adhesive material, similar to rubber caulking compound, made from rubber or plastic resins. However, it should be understood that any suitable method may be employed for this same purpose without departing from the spirit of the invention.

Figure 3:
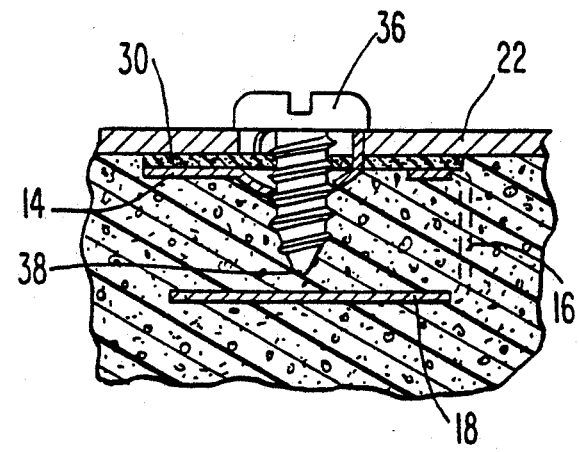
FIG. 3 is a sectional front elevational view of the nut plate fastener of FIG. 2 filled with insulative plastic foam and retaining a screw member.

In operation, as shown in FIGS. 2 and 3, the nut plate fastener 10 is secured to the panel member 22 via the adhesive tape 30 which covers the panel aperture 20. In some instances, the area behind the panel member 22 is filled with insulative plastic foam as is shown in FIG. 3, such as when the nut plate fastener 10 is applied to a refrigerator panel. In such instances, the tape 30 will prevent the foam from leaking through the aperture 20, after which the foam is allowed to harden. A screw 36 is inserted through the aperture 20 and engages the tape 30. The screw tip 38 penetrates the tape 30 and is received by the screw impression hole 24. As the screw 36 is rotated, its shank centers the screw impression hole 24 which acts as a nut to the helix of the screw shank. The screw 36 is securely fastened in the position illustrated in FIG. 3, with the top plate 18 positioned above the screw tip 38. In this configuration, the screw 36 is confined between the top plate 18 and the bottom plate 14.

Furthermore, the connecting portion 16 can be provided with a hole 42 therethrough as shown in FIG. 1, which permits the insulative plastic foam to enter between the top plate 18 and bottom plate 14. Preferably, the bottom plate 14 is longer than the top plate 18.

Figure 4:
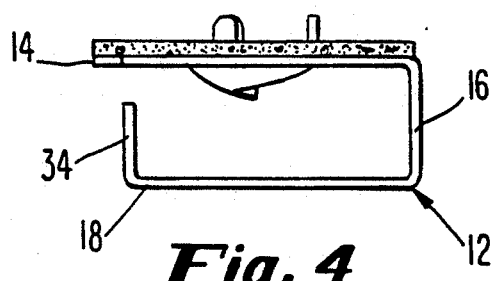
FIG. 4 is a front elevational view of the nut plate fastener of FIG. 1 further including a side plate extending from a top plate thereof.
Figure 4A:
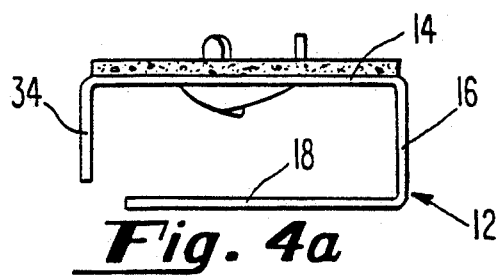
FIG. 4a is a front elevational view of the nut plate fastener of FIG. 1 further including a side plate extending from a bottom plate thereof.

In addition, as shown in FIG. 4, the nut plate fastener 10 can be comprised having a side plate 34 formed as an integral portion of the resilient body member 12 and connected to the top plate 18. As illustrated, the side plate 34 forms a substantially box-like section surrounding the screw member 36 when received. Alternatively, the side plate 34 can be connected to the bottom plate 14 as is shown in FIG. 4a.

Figure 5:
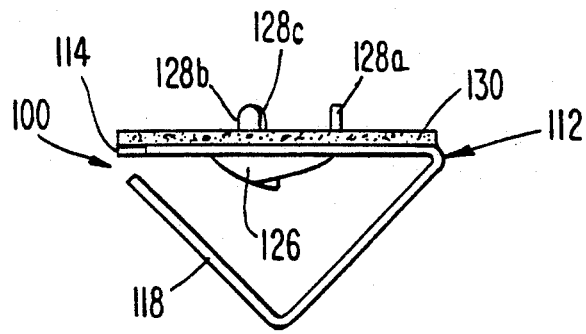
FIG. 5 is a front elevational view of a second embodiment of a nut plate fastener according to the present invention.

In FIG. 5 is shown a second preferred embodiment according to the present invention. The nut plate fastener 100, as illustrated, comprises a resilient body member 112, also preferably stamped from sheet metal, which consists of, as portions of a one-piece integral member, a bottom plate 114 and a substantially "V" shaped upper plate 118. Similar to that described above in relation to nut plate fastener 10, three tabs 128a–128c, a screw impression hole (not shown), a substantially helical dome-shaped screw impression 126 and an adhesive tape 130 are also provided.

In operation of the nut plate fastener 100, a screw member (not shown) when secured in its fastened position will be confined between the substantially "V" shaped top plate 118 and the bottom plate 114.

Figure 5A:
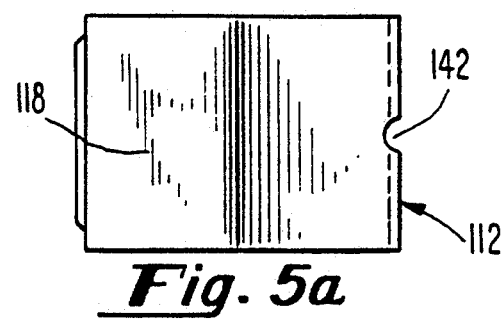
FIG. 5a is a top plan view of the nut plate fastener of FIG. 5.

Furthermore, the top plate 118 can be provided with a hole 142 therethrough as illustrated in FIG. 5a for a purpose similar to the nut plate fastener 10 described above.

It will be recognized by those skilled in the art that changes may be made by the above-described embodiments of the invention without departing from the broad inventive concepts thereof. For example, the top plate, which is described above being either generally flat in connection with the connecting portion, or generally "V" shaped, can be comprised having any appropriate configuration, for example "U" shaped, curved, etc. furthermore, in some applications the substantially helical dome-shaped screw impression can be replaced by a plain hole. In certain other applications, the tabs are not needed, for example, in robot or other mechanical placement of the fastener. In such applications, the protruding tabs may be omitted. It is understood, therefore, that this invention is not limited to the particular embodiments disclosed, but it is intended to cover all modifications which are within the scope and spirit of the invention as defined by the appended claims.

I claim:

1. A nut plate fastener adapted for being mounted in an aperture formed in a panel member for retaining a threaded screw member having a screw tip inserted through the aperture formed in the panel member, the nut plate fastener comprising:
    an integral member formed from a resilient material and having as portions thereof:
    a bottom plate having a bottom face adapted for abutting the panel member when in the mounted position and a screw receiving means for receiving and retaining the screw threads of the screw member; and
    a top plate connected to the bottom plate adapted for covering the screw member, the top plate defining a substantially plane member over the entire length thereof, wherein the screw threads and screw tip of the threaded screw member are confined between the two plates when the screw member is received by the bottom plate;
    the nut plate fastener further including means for securing the bottom plate to the panel member when mounted in the panel aperture.

2. A nut plate fastener according to claim 1, further comprising a connecting portion for connecting the bottom plate and the top plate and separating the top plate from the bottom plate at a specified distance for confining the screw threads and screw up of the threaded screw member between the two plates.

3. A nut plate fastener according to claim 2, wherein the connecting portion includes a hole therethrough.

4. A nut plate fastener according to claim 2, wherein the top plate and the bottom plate are substantially parallel to each other.

5. A nut plate fastener according to claim 4, further including at least one side plate extending downward from the upper plate generally opposite the connecting portion and toward the bottom plate.

6. A nut plate fastener according to claim 4, further including at least one side plate extending upward from the bottom plate generally opposite the connecting portion and toward the upper plate.

7. A nut plate fastener according to claim 1, wherein the securing means comprises an adhesive material secured to the bottom face of the bottom plate, and having a bottom pressure sensitive adhesive on its exposed face to adhere the nut plate fastener to the panel member.

8. A nut plate fastener according to claim 1, wherein the screw receiving means comprises a substantially helical screw impression dome formed in the bottom plate directed toward the top plate and including a hole therethrough.

9. A nut plate fastener according to claim 1, further including at least one locating tab projecting from the bottom face of the bottom plate for locating the nut plate relative to the panel aperture.

10. A nut plate fastener adapted for being mounted in an aperture formed in a panel member for retaining a threaded screw member having a screw tip inserted through the aperture formed in the panel member, the nut plate fastener comprising:
    an integral member formed from a resilient material and having as portions thereof;
    a bottom plate having a bottom face adapted for abutting the panel member when in the mounted position and a screw receiving means for receiving and retaining the screw threads of the screw member, wherein the screw receiving means comprises a substantially helical screw impression dome formed in the bottom plate directed toward the top plate and including a hole therethrough;
a top plate connected to the bottom plate adapted for covering the screw member, wherein the screw threads and screw tip of the thread screw member are confined between the two plates when the screw member is received by the bottom plate;
a connecting portion for connecting the bottom plate and the top plate and separating the top plate from the bottom plate at a specified distance for confining the screw threads and screw tip of the threaded screw member between the two plates, the top plates and the bottom plate being substantially parallel to each other; and
at least one locating tab projecting from the bottom face of the bottom plate for locating the nut plate relative to the panel aperture;
the nut plate fastener further including means for securing the bottom plate to the panel member when mounted in the panel aperture, the securing means comprising an adhesive material secured to the bottom face of the bottom plate, and having a bottom pressure sensitive adhesive on its exposed face to adhere the nut plate fastener to the panel member.

11. A nut plate fastener according to claim 10, further including at least one side plate extending downward from the upper plate generally opposite the connecting portion and toward the bottom plate.

12. A nut plate fastener according to claim 10, further including at least one side plate extending upward from the bottom plate generally opposite the connecting portion and toward the upper plate.

13. A nut plate fastener according to claim 10, wherein the connecting portion includes a hole therethrough.

14. A nut plate fastener adapted for being mounted in an aperture formed in a panel member for retaining a threaded screw member inserted through the aperture formed in the panel member, the nut plate fastener comprising:
an integral member formed from a resilient material and having as portions thereof:
a bottom plate having a bottom face adapted for abutting the panel member when in the mounted position and a screw receiving means for receiving and retaining the screw threads of the screw member, wherein the screw receiving means comprises a substantially helical screw impression dome formed in the bottom plate directed toward the top plate and including a hole therethrough;
a top plate connected to the bottom plate adapted for covering the screw member, the top plate comprising a substantially "V" shaped member having at least a first end thereof connected to the bottom plate, wherein the screw threads of the screw member are confined between the two plates when the screw member is received by the bottom plate; and
at least one locating tab projecting from the bottom face of the bottom plate for locating the nut plate relative to the panel aperture;
the nut plate fastener further including means for securing the bottom plate to the panel member when mounted in the panel aperture, the securing means comprising an adhesive material secured to the bottom face of the bottom plate, and having a bottom pressure sensitive adhesive on its exposed face to adhere the nut plate fastener to the panel member.

15. A nut plate fastener according to claim 14, wherein the top plate includes a hole therethrough.

16. A nut plate fastener adapted for being mounted in an aperture formed in a panel member for retaining a threaded screw member having a screw tip inserted through the aperture formed in the panel member, the nut plate fastener comprising:
an integral member formed from a resilient material and having as portions thereof:
a bottom plate having a bottom face adapted for abutting the panel member when in the mounted position and a screw receiving means for receiving and retaining the screw threads of the screw member; and
a top plate connected to the bottom plate adapted for covering the screw member, the top plate defining a substantially "V" shaped member over the entire length thereof and including at least a first end thereof connected to the bottom plate, wherein the screw threads and screw tip of the threaded screw member are confined between the two plates when the screw member is received by the bottom plate;
the nut plate fastener further including means for securing the bottom plate to the panel member when mounted in the panel aperture.

17. A nut plate fastener according to claim 16, wherein the securing means comprises an adhesive material secured to the bottom face of the bottom plate, and having a bottom pressure sensitive adhesive on its exposed face to adhere the nut plate fastener to the panel member.

18. A nut plate fastener according to claim 16, wherein the screw receiving means comprises a substantially helical screw impression dome formed in the bottom plate directed toward the top plate and including a hole therethrough.

19. A nut plate fastener according to claim 16, further including at least one locating tab projecting from the bottom face of the bottom plate for locating the nut plate relative to the panel aperture.

20. A nut plate fastener adapted for being mounted in an aperture formed in a panel member for retaining a threaded screw member having a screw tip inserted through the aperture formed in the panel member, the nut plate fastener comprising:
an integral member formed from a resilient material and having as portions thereof:
a bottom plate having a bottom face adapted for abutting the panel member when in the mounted position and a screw receiving means for receiving and retaining the screw threads of the screw member; and
a top plate connected to the bottom plate adapted for covering the screw member, the top plate defining a substantially planer member over the entire length thereof, wherein the screw threads and screw tip of the threaded screw member are confined between the two plates when the screw member is received by the bottom plate;
the nut plate fastener further including means for securing the bottom plate to the panel member when mounted in the panel aperture, wherein the securing means comprises an adhesive material secured to the bottom face of the bottom plate, and having a bottom pressure sensitive adhesive on its exposed face to adhere the nut plate fastener to the panel member.

21. A nut plate fastener according to claim 20, further comprising a connecting portion for connecting the bottom plate and the top plate and separating the top plate from the bottom plate at a specified distance for confining the screw threads and screw tip of the threaded screw member between the two plates.

22. A nut plate fastener according to claim 21, wherein the connecting portion includes a hole therethrough.

23. A nut plate fastener according to claim 21, wherein the top plate and the bottom plate are substantially parallel to each other.

24. A nut plate fastener according to claim 23, further including at least one side plate extending downward from the upper plate generally opposite the connecting portion and toward the bottom plate.

25. A nut plate fastener according to claim 23, further including at least one side plate extending upward from the bottom plate generally opposite the connecting portion and toward the upper plate.

26. A nut plate fastener according to claim 20, wherein the top plate comprises a substantially "V" shaped member having at least a first end thereof connected to the bottom plate.

27. A nut plate fastener according to claim 20, wherein the screw receiving means comprises a substantially helical screw impression dome formed in the bottom plate directed toward the top plate and including a hole therethrough.

28. A nut plate fastener according to claim 20, further including at least one locating tab projecting from the bottom face of the bottom plate for locating the nut plate relative to the panel aperture.

29. A nut plate fastener adapted for being mounted in an aperture formed in a panel member for retaining a threaded screw member having a screw tip inserted through the aperture formed in the panel member, the nut plate fastener comprising:
an integral member formed from a resilient material and having as portions thereof:
a bottom plate having a bottom face adapted for abutting the panel member when in the mounted position and a screw receiving means for receiving and retaining the screw threads of the screw member; and
a top plate connected to the bottom plate adapted for covering the screw member, the top plate defining a substantially planer member over the entire length thereof, wherein the screw threads and screw tip of the threaded screw member are confined between the two plates when the screw member is received by the bottom plate;
the nut plate fastener further including means for securing the bottom plate to the panel member when mounted in the panel aperture; and
at least one locating tab projecting from the bottom face of the bottom plate for locating the nut plate relative to the panel aperture.

30. A nut plate fastener according to claim 29, further comprising a connecting portion for connecting the bottom plate and the top plate and separating the top plate from the bottom plate at a specified distance for confining the screw threads and screw tip of the threaded screw member between the two plates.

31. A nut plate fastener according to claim 30, wherein the connecting portion includes a hole therethrough.

32. A nut plate fastener according to claim 30, wherein the top plate and the bottom plate are substantially parallel to each other.

33. A nut plate fastener according to claim 32, further including at least one side plate extending downward from the upper plate generally opposite the connecting portion and toward the bottom plate.

34. A nut plate fastener according to claim 32, further including at least one side plate extending upward from the bottom plate generally opposite the connecting portion and toward the upper plate.

35. A nut plate fastener according to claim 29, wherein the top plate comprises a substantially "V" shaped member having at least a first end thereof connected to the bottom plate.

36. A nut plate fastener according to claim 29, wherein the securing means comprises an adhesive material secured to the bottom face of the bottom plate, and having a bottom pressure sensitive adhesive on its exposed face to adhere the nut plate fastener to the panel member.

37. A nut plate fastener according to claim 29, wherein the screw receiving means comprises a substantially helical screw impression dome formed in the bottom plate directed toward the top plate and including a hole therethrough.

38. A nut plate fastener adapted for being mounted in an aperture formed in a panel member for retaining a threaded screw member having a screw tip inserted through the aperture formed in the panel member, the nut plate fastener comprising:
an integral member formed from a resilient material and having as portion thereof:
a bottom plate having a bottom face adapted for abutting the panel member when in the mounted position;
a top plate connected to the bottom plate adapted for covering the screw member, the top plate defining a substantially planer member over the entire length thereof, wherein the screw threads and screw tip of the threaded screw member are confined between the two plates when the screw member is received by the bottom plate;
the bottom plate further including a screw receiving means for receiving and retaining screw threads of the screw member, the screw receiving means comprising a substantially helical screw impression done formed in the bottom plate directed toward the top plate and including a hole therethrough; and
the nut plate fastener further including means for securing the bottom plate to the panel member when mounted in the panel aperture.

39. A nut plate fastener according to claim 38, further comprising a connecting portion for connecting the bottom plate and the top plate and separating the top plate from the bottom plate at a specified distance for confining the screw threads and screw tip of the threaded screw member between the two plates.

40. A nut plate fastening according to claim 39, wherein the connecting portion includes a hole therethrough.

41. A nut plate fastener according to claim 39, wherein the top plate and the bottom plate are substantially parallel to each other.

42. A nut plate fastener according to claim 41, further including at least one side plate extending downward from the upper plate generally opposite the connecting portion and toward the bottom plate.

43. A nut plate fastener according to claim 41, further including at least one side plate extending upward from the bottom plate generally opposite the connecting portion and toward the upper plate.

44. A nut plate fastener according to claim 38, wherein the top plate comprises a substantially "V" shaped member having at least a first end thereof connected to the bottom plate.

45. A nut plate fastener according to claim 38, wherein the securing means comprises an adhesive material secured to the bottom face of the bottom plate, and having a bottom pressure sensitive adhesive on its exposed face to adhere the nut plate fastener to the panel member.

46. A nut plate fastener according to claim 38, further including at least one locating tab projecting from the bottom face of the bottom plate for locating the nut plate relative to the panel aperture.

* * * * *

UNITED STATES PATENT AND TRADEMARK OFFICE
CERTIFICATE OF CORRECTION

PATENT NO. : 5,322,400
DATED : JUNE 21, 1994
INVENTOR(S) : JAMES J. FORD

It is certified that error appears in the above-indentified patent and that said Letters Patent is hereby corrected as shown below:

Column 1, line 15, "week" should be --weak--

Column 4, line 28, "up" should be --tip--

Column 5, line 7, "the thread" should be --the threaded--

Column 6, line 60, "planer" should be --planar--

Column 7, line 52, "planer" should be --planar--

Column 8, line 36, "portion" should be --portions--

Column 8, line 42, "planer" should be --planar--

Column 8, line 63, "fastening" should be --fastener--

Signed and Sealed this

Twentieth Day of September, 1994

Attest:

BRUCE LEHMAN

*Attesting Officer*    *Commissioner of Patents and Trademarks*